March 5, 1968 J. S. BOYERS ET AL 3,372,240

TIME INDICATING RECORDING AND REPRODUCING APPARATUS

Filed Oct. 14, 1963 2 Sheets-Sheet 1

INVENTORS:
JOHN S. BOYERS
ROGER C. CURTIS
RALPH H. SHERMAN JR.
RAYMOND R. CROWLEY

Curtis, Morris & Safford
ATTORNEYS.

TIME INDICATING RECORDING AND REPRODUCING APPARATUS

INVENTORS:
JOHN S. BOYERS
ROGER C. CURTIS
RALPH H. SHERMAN, JR.
RAYMOND R. CROWLEY

Curtis, Morris & Safford
ATTORNEYS.

United States Patent Office 3,372,240

Patented Mar. 5, 1968

3,372,240

TIME INDICATING RECORDING AND REPRODUCING APPARATUS

John S. Boyers, Bridgeport, Roger C. Curtis, New Haven, Ralph H. Sherman, Jr., Bridgeport, and Raymond R. Crowley, Fairfield, Conn., assignors to Dictaphone Corporation, Bridgeport, Conn., a corporation of New York Filed Oct. 14, 1963, Ser. No. 315,839
8 Claims. (Cl. 179—100.2)

ABSTRACT OF THE DISCLOSURE

A recording and reproducing system particularly useful in monitoring audio communications such as communications between aircraft and an aircraft control tower at an airport. The audio communication is recorded on a magnetic record such as a belt or tape, and coded digital signals are recorded at regular intervals on the record near the recorded audio communications. Each of the coded digital signals represents the time of day when the adjacent communication was recorded. The reproducing portion of the system audibly reproduces the audio communications while simultaneously converting the coded digital time of day signals into decimal form and displaying them visually. Thus, a particular recorded portion can be located rapidly because the time of day when it was recorded is displayed visually while the recording is being reproduced. The system for producing coded digital time-of-day signals includes synchronously-driven rotary drums with coded patterns of holes in them. Light from lamps shines through the holes and into a photoelectric light-to-electric signal transducer structure which produces the desired signals.

This invention relates to apparatus for converting time-indications into recordable digital signals and to apparatus for recording and reproducing such signals; more particularly, this invention relates to apparatus converting time-indications into recordable digital signals, recording said signals together with other information, and visually reproducing such signals concurrently with the information so as to indicate the time at which the information was recorded.

In many recording and reproducing systems it is desirable to provide means for indicating the precise time at which various information is recorded. For example, in systems used to record and reproduce the communications between airport control tower operators and airplane pilots, it is desirable to provide a means for indicating the time at which the communication was recorded so that in the investigation of accidents or other unnatural occurrences, the time at which specific communications took place can be pin-pointed.

In a typical prior art example of such recording and reproducing systems, the communications between the airplanes and the control tower are recorded in a number of side-by-side tracks on a magnetic tape having a length sufficient to record twenty-four or more hours of conversation. As the communication is being recorded in this prior art system, an audible indication of the time of day is recorded in a separate track on the magnetic tape. Upon reproduction of the conversations, the reproducing apparatus must be switched alternately back and forth between the communication track and the time track in order to pin-point the time at which a given communication took place. As a result, it has been a difficult and painstaking task to locate the information to be reproduced and determine the time at which it was recorded.

Accordingly, an object of this invention is to provide recording and reproducing apparatus in which both the information and the time indicating signal can be reproduced and easily detected simultaneously.

Another object of the present invention is to provide recording apparatus for recording substantially simultaneously on a record medium both information signals and digital signals representative of time.

A further object of the present invention is to provide improved apparatus useful in recording and reproducing systems for converting time into digital signals suitable for recording on a record medium.

The drawings and descriptions that follow describe the invention and indicate some of the ways in which it can be used so as to meet the above-stated objects. In addition, some of the advantages provided by the invention will be pointed out.

Figure 1:
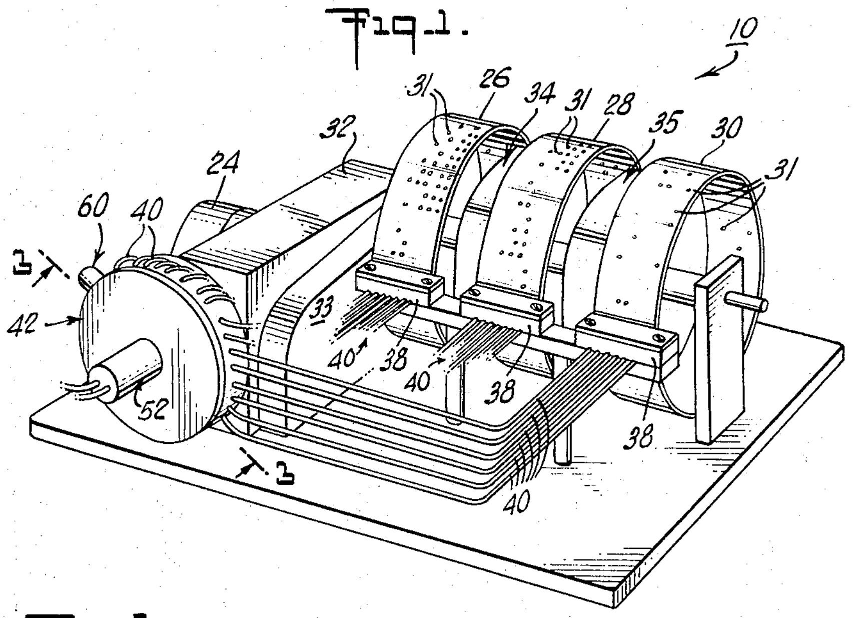
FIGURE 1 is a perspective, partly schematic view of time-to-digital converting apparatus in accordance with the present invention.

Briefly, the time recording, reproducing and visual display apparatus of the present invention is constructed and operated as follows. A time-to-digital converter device, generally indicated at 10 in FIGURES 1 and 2, converts motion proportional to time into time-indicating digital electrical signals. This timed motion may be provided by any timing drive source such as a clock motor; preferably, this motion is rotary motion provided by a synchronous electrical motor energized by standard alternating current the frequency of which, as is well known, is regulated with respect to time. The digital output signals of the converter 10 are communicated to the recording circuit, indicated generally at 12 in FIGURE 4, which converts these signals into 1000 c.p.s. and 400 c.p.s. electrical pulses which are delivered to a recording transducer 14 in a digitally coded sequence.

Recording transducer 14 is a component of standard multi-channel recording and reproducing apparatus which records both the digital time signals and correlated information substantially simultaneously on a suitable record medium 16 such as magnetic tape. The digital time information is recorded in the form of electrical bursts or pulses having a frequency of either 1000 c.p.s. or 400 c.p.s. which are recorded in a track adjacent to the track or tracks bearing the correlated information. A reproducing transducer 18, which is a component of the above-mentioned standard recording and reproducing apparatus, detects both the digital time signals and the correlated information recorded on the record medium 16 and delivers the digital time signals to visual display apparatus generally indicated at 20 in FIGURE 5.

The visual display arrangement 20 converts the digital signals it receives into a decimal form and otherwise adapts them to operate an electrical display board 22 to produce a visual indication of the time at which the information was recorded. The correlated information may be reproduced audibly or in any other convenient form by the standard reproducing apparatus so that the time indication appears on display board 22 simultaneously with the correlated information and the observer can quickly and easily determine the time at which the information was recorded.

Referring again to FIGURES 1 and 2, the time-to-digital converter 10 includes a synchronous electrical motor 24 which drives three drums 26, 28 and 30 through gear boxes 32 and 33 and three "Geneva" mechanisms, one of which is located in gear box 32, and the others of which are indicated at 34 and 35. By means of these well-known Geneva mechanisms, drum 26 is rotated or "stepped" one increment for every revolution of a gear driven by motor 24, drum 28 is stepped one increment for every revolution of drum 26, and drum 30 is stepped one increment for every revolution of drum 28. Since the speed of synchronous motor 24 is proportional to time, drums 26, 28 and 30 are driven at rates proportional to time. Drum 26 serves as a "seconds" wheel and is adapted to rotate one revolution per minute, drum 28 serves as a "minutes" wheel and rotates one revolution per hour, while drum 30 serves as an "hours" wheel and rotates one revolution every 24 hours.

Drums 26, 28 and 30 are made of metal and are perforated with holes 31 arranged in a binary-coded pattern around the circumference of the drums so that as the drums are rotated the holes appear in a binary-coded sequence. The code arrangements are selected to provide seconds indications from drum 26 of from zero to 59 seconds, minutes indications from drum 28 of from zero to 59 minutes, and hours indications from drum 30 of from zero to 24 hours.

Figure 2:
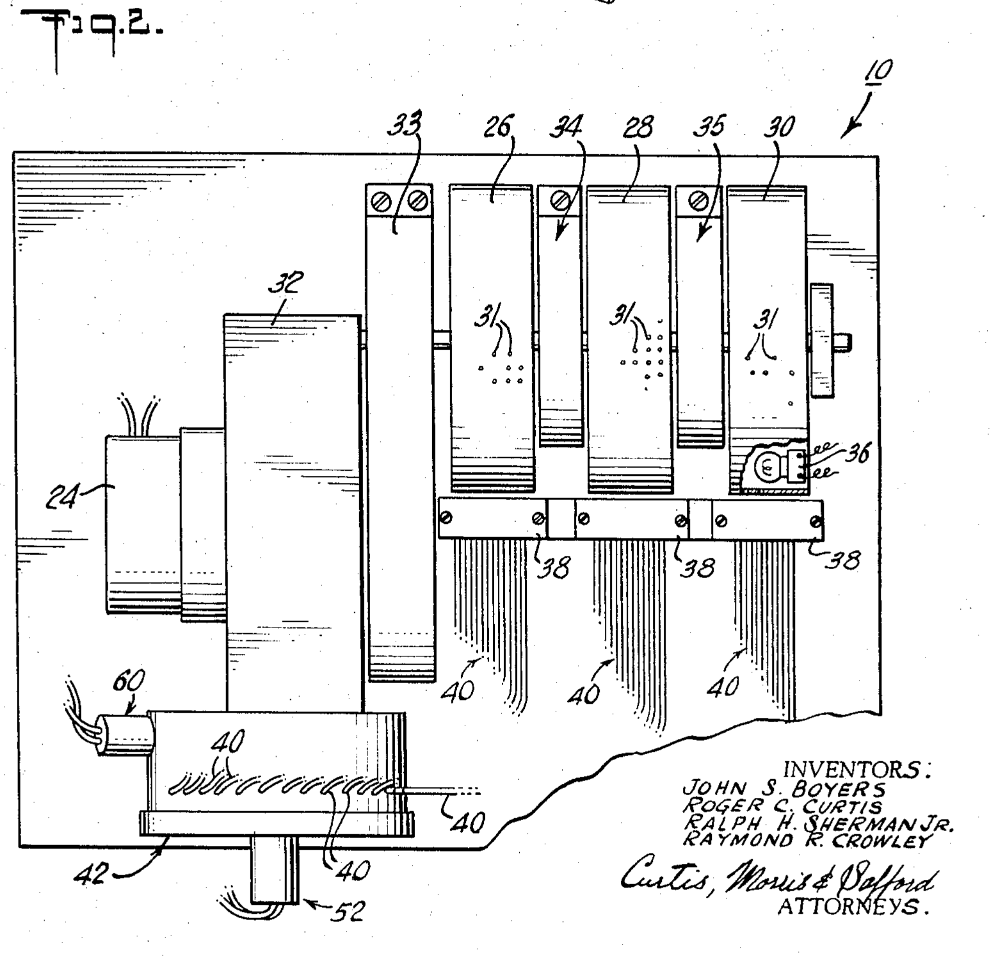
FIGURE 2 is a plan view, partly broken away and partly schematic, of the apparatus shown in FIGURE 1.

Referring now to FIGURE 2, a lamp 36 is positioned inside each of the drums 26, 28 and 30. Each of these lamps 36 is positioned opposite a block 38 which holds the ends of a plurality of light-tube rods 40 adjacent the exterior surface of the drum. There is one light-tube rod 40 for each circumferential row of holes on each drum. Rods 40 are made of materials such that a light signal received at one end of a rod will be transmitted to the other end of the rod, despite the fact that the rod is bent in various shapes. Preferably, these rods are made of acrylic plastic resin material such as that sold under the trade name "Lucite" by E. I. Du Pont de Nemours and Company, Wilmington, Del. The opposite ends of light-tube rods 40 are fitted into holes through a wall of a scanning unit 42.

Figure 3:
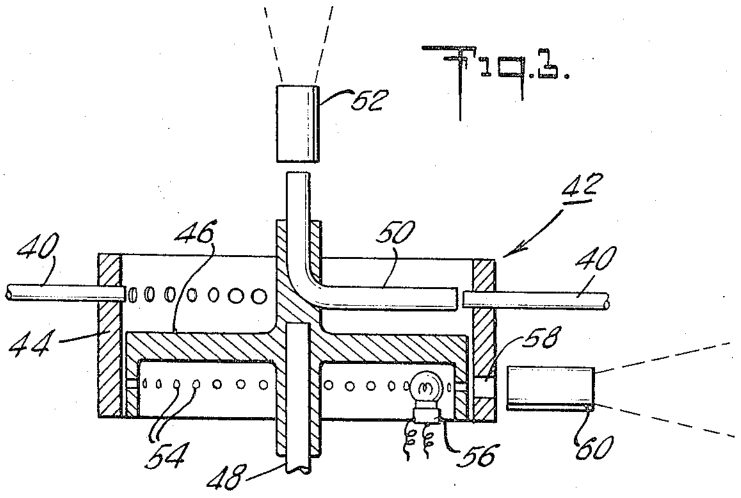
FIGURE 3 is a schematic view of a component of the apparatus shown in FIGURES 1 and 2, taken along line 3—3 of FIGURE 1, in the direction of the arrows.

Referring now to FIGURE 3 as well as FIGURES 1 and 2, scanning unit 42 includes a generally cylindrically-shaped housing 44 with a rotor 46 being mounted so as to rotate in housing 44. The output ends of rods 40 are fitted into holes spaced circumferentially around housing 44. Rotor 46 is mounted on a shaft 48 which is driven by synchronous motor 24 through gear box 32 at a speed proportional to time. Also secured to rotor 46 is a sweeping element 50 which is made of the same material as light-tubes 40 and is bent into an L-shape. One end of sweeping element 50 is positioned so as to receive light signals transmitted into unit 42 by the output ends of light-tube rods 40, and the opposite end of element 50 is aligned coaxially with shaft 48 and is positioned to transmit the light signal it receives into a signal photocell 50.

Rotor 46 has a plurality of holes 54 positioned at spaced intervals around its circumference. The spacing between these holes 54 is the same as that between adjacent output ends of rods 40, e.g., 10 degrees between adjacent holes. A lamp 56 is positioned inside rotor 46 opposite a hole 58 in housing 44 so that when one of the holes 54 is aligned with hole 58 a light signal is delivered to clock photocell 60. The input or sweeping end of sweeping element 50 is aligned with respect to holes 54 so that a light signal will be delivered to clock photocell 60 at the same time that a corresponding light signal is received through one of the light tubes 40.

By means of the above arrangement, rotor 46 rotates at a speed of one revolution per second so that the rotation of rotor 46 is synchronized with the "stepping" of drums 26, 28 and 30 and provides a coded digital time signal once every second. The operation of the Geneva mechanisms is such that the drums are rotated in quick "steps" only during the time when sweeping element 50 is scanning the portion of the housing 44 containing no light tubes. Thus, light tubes 40 are scanned only while drums 26, 28 and 30 are stationary. During each revolution of rotor 46 one electrical clock signal is produced by clock photocell 60 for every light tube 40 entering scanning unit 42. That is, there are twenty light tubes and twenty holes 54 in rotor 46 so that twenty clock pulses are produced by photocell 60. If a light signal appears in the particular light tube 40 being scanned, an electrical signal is produced by signal photocell 52 simultaneously with the clock signal produced by photocell 60. The coincidence of the signal pulse and the clock pulse is determined by the coded arrangement of holes in drums 26, 28 and 30. Thus, photocells 52 and 60 together provide during each rotor revolution, a digitally coded electrical output signal consisting of a series of twenty pulses each of which comprises either two coincident clock and signal pulses or a single clock pulse.

Figures 4, 5:
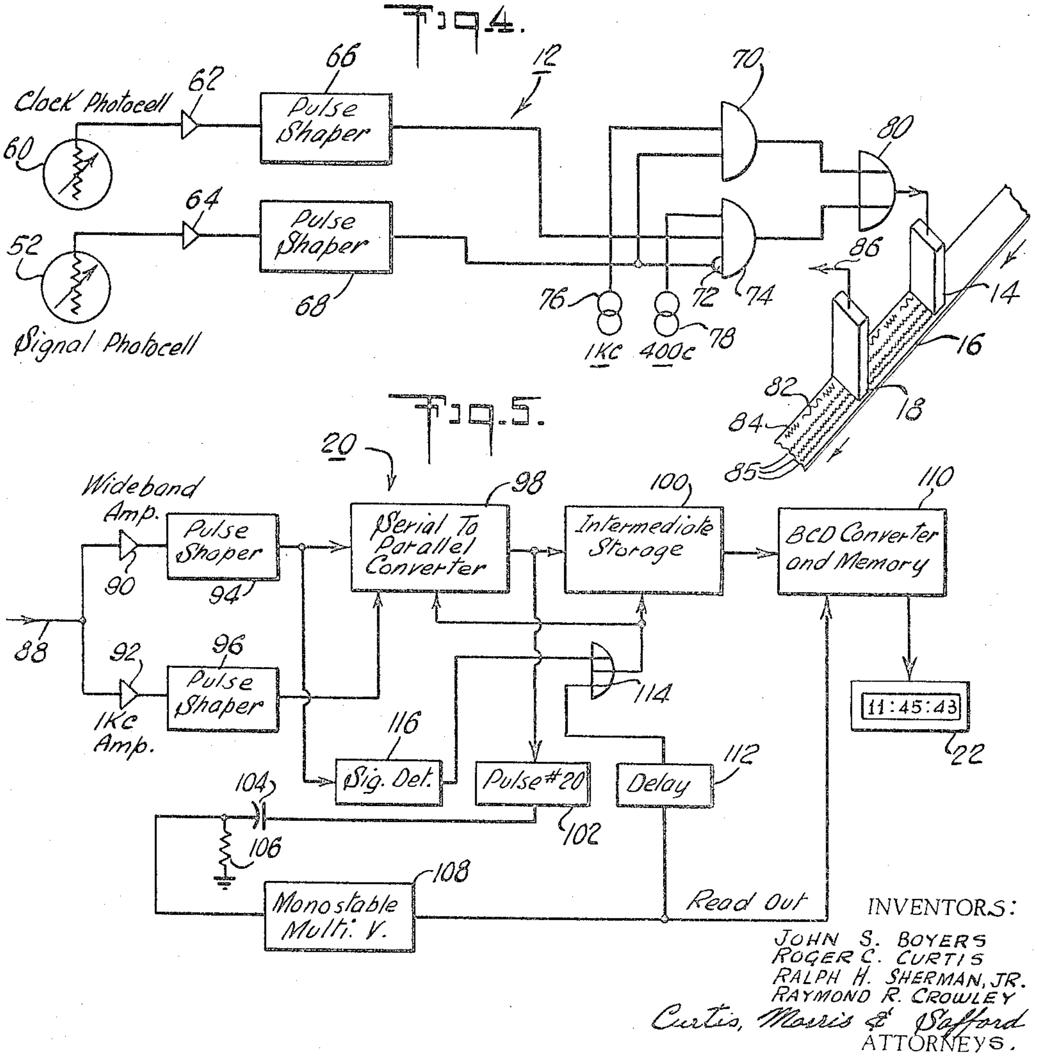
FIGURE 4 is a schematic circuit diagram of electrical equipment used in recording and reproducing apparatus of the present invention.
FIGURE 5 is a schematic circuit diagram of visual display apparatus in accordance with the present invention.

Referring now to the recording circuit 12 in FIGURE 4, the output signals of clock photocell 60 and signal photocell 52 are amplified and shaped, respectively, by amplifiers 62 and 64 and pulse shapers 66 and 68. Amplifiers 62 and 64 are standard audio-frequency amplifiers, and pulse shapers 66 and 68 are well-known devices which give the pulses a generally square shape and a substantially constant width.

The signal pulses from pulse shaper 68 are input to a standard "and" gate 70 and to the disabling portion 72 of an "inhibit" gate 74. The clock pulse output from pulse shaper 66 is fed to "inhibit" gate 74. A 1000 c.p.s. alternating current signal also is supplied to "and" gate 70 from a generator 76, and a 400 c.p.s. alternating current signal is supplied to gate 74 from a generator 78. The output of gates 70 and 74 is fed to an "or" gate 80 whose output is in turn fed to recording transducer 14 which records the signals received by "or" gate 80 on the record medium 16.

As explained above, for each rotation of rotor 46 twenty clock pulses will be produced by clock photocell 60. During each clock pulse, signal photocell 52 either develops a signal or does not develop a signal, depending upon whether a light signal is delivered through the light tube 40 being scanned at that instant. If no signal is developed by photocell 52, both "and" gate 70 and "inhibit" gate 74 will operate in the normal "and" gate fashion. That is, either will develop a signal at its output if it receives a signal on both of its input lines. Therefore, "and" gate 74 will pass a 400 c.p.s. signal since it receives a signal from clock photocell 60 and another from 400 c.p.s. generator 78. This signal will be passed through "or" gate 80 (which will pass a signal received on either of its input terminals) to recording transducer 14. Thus, a 400 c.p.s. "burst" signal having the duration of a clock pulse will be recorded on the record medium 16. This recorded 400 c.p.s. burst signal is represented by the numeral 82 in FIGURE 4. If, however, a signal is produced by photocell 52 simultaneously with the clock pulse, "inhibit" gate 74 will be disabled and will not produce an output signal. Instead, "and" gate 70 will receive a signal from both signal photocell 52 and 1000 c.p.s. generator 76 and will deliver a 1000 c.p.s. "burst" signal through "or" gate 70 for the duration of the signal pulse. This thousand cycle burst then is recorded on the record medium 16 and is represented in FIGURE 4 by the numeral 84.

Thus, the motion proportional to time produced by synchronous motor 24 is converted into digital electrical signals and then is recorded on the record medium in the form of "bursts" of either 400 or 1000 cycle signals, the digital arrangement of these bursts being an indication of time. The correlated information is recorded in parallel channels 85 simultaneously with digital time signals 82 and 84 so that the time signals appear immediately adjacent the information to provide an inseparable record of the time at which the information was recorded. It should be understood that such correlated information is fed into other input terminals (not shown) of recording transducer 14.

In reproducing the information and time signals recorded on record member 16, the output lead 86 of reproducing transducer 18 is connected to the input terminal 88 of the reproducing and display circuit 20 shown in FIGURE 5. The signal from reproducing transducer 18 is fed to a wide-band alternating current amplifier 90 and a tuned alternating current amplifier 92 which is tuned to pass signals having a frequency of 1000 c.p.s. Thus, amplifier 90 passes both the 400 c.p.s. and the 1000 c.p.s. signals whereas amplifier 92 passes only the 1000 c.p.s. signal which is produced when a signal is produced by signal photocell 52.

The signals from amplifiers 90 and 92 are fed through pulse shapers 94 and 96 to a serial-to-parallel converter 98. Serial-to-parallel converter 98 is of a known type consisting of a five-stage binary counter driving twenty "and" gates. It converts the serial digital intelligence it receives into parallel form. The pulses provided by wide band amplifier 90 serve as clock pulses in that each of them, regardless of whether it is a 400 c.p.s. or a 1000 c.p.s. signal, steps serial-to-parallel converter 98 one step. When a 1000 c.p.s. signal is supplied through amplifier 92, it coincides with a clock signal from amplifier 90 and operates an "and" gate of converter 98. This causes information to be delivered to an intermediate storage device 100 which stores this intelligence until released.

After converter 98 has received twenty clock pulses from amplifier 90, a transfer device 102 produces an output signal which transfers the information out of storage device 100. The output signal from transfer device 102 is differentiated by a capacitor 104 and a resistor 106 and is fed to a monostable multivibrator 108 which operates in response to receiving the trailing edge of the output signal of transfer device 102 to produce a read-out signal which is supplied to a binary-coded-to-decimal converter and storage unit 110. Converter and storage unit 110 converts the signals it receives from binary coded to decimal form suitable to actuate the display board 22 and stores these signals until they are replaced by new signals.

The read-out signal recived by unit 110 causes any intelligence stored in its memory to be erased and causes the transfer of information stored in intermediate storage unit 100 into converter 110, from which it is transmitted to the display device 22, where the information is visually displayed as the time of day in hours, minutes and seconds.

The read-out pulse produced by multivibrator 108 also is fed to a delay circuit 112 which differentiates and amplifies the read-out signal and transmits it to an "or" gate 114 whose output is fed to converter unit 98 and to storage unit 100. Upon receipt of the read-out signal through "or" gate 114, units 98 and 100 are reset to zero to await the receipt of a new series of digital pulses.

A signal detector 116 is connected between the output of pulse shaper 94 and an input terminal of "or" gate 114. This detector produces a reset signal a short time after the train of pulses from shaper 94 is broken. This reset signal is transmitted through "or" gate 114 to converter 98 and storage unit 100 to reset them to zero. Thus, when a train of signals is broken before twenty pulses have been received, no read-out signal is produced and no intelligence is transmitted from storage 100. This arrangement allows the time-to-digital converter mechanism 10 to be started with the scanning member 50 in any position if the first revolution of rotor 46 produces fewer than twenty pulses, no signal will be displayed on board 22.

It should be understood that standard reproducing equipment is used to reproduce the correlated information appearing on tracks 85 simultaneously with the reproduction and display of time information on display board 22. This correlated information may be reproduced in audible form so that the observer can listen to the audible information while simultaneously observing the time of day at which it was recorded.

It should be understood that each of the circuit components of display circuit 20 is well-known. For example, a suitable converter and memory unit is the SM124A Binary-Coded Decimal Converter manufactured by Sylvania Electric Products, Inc. This device converts the binary-coded information stored in intermediate storage unit 100 into decimal form suitable for use in the display board 22. A suitable display board is the NU106B 24 Hour Clock Display which also is produced by Sylvania Electric Products, Inc. This is an electroluminescent device which displays the time in numerals approximately one inch high.

The above description of the invention is intended to be illustrative and not limiting. Various changes or modifications of the embodiment described may occur to those skilled in the art and these can be made without departing from the spirit or scope of the invention as set forth in the claims.

We claim:

1. Apparatus for monitoring an audio communications system, said apparatus comprising, in combination, means for recording audio communications signals on a record medium, means for generating time-of-day representative coded digital electrical signals at predetermined, relatively short, regular time intervals, means for recording each of said digital signals on said record medium in a position physically fixed with respect to the signals recorded at the time the digital signal is recorded, and with a spacing corresponding to said regular time intervals, each of said coded digital signals uniquely representing the time of day at which it is recorded, means for audibly reproducing said recorded communications signals while simultaneously sensing the recorded digital time signals, converting them into visible form, and displaying them in said visible form.

2. Apparatus as in claim 1 in which said digital time signals are displayed in numerical form, sequentially and one-at-a-time, each being displayed only when the corresponding communication signal record is being reproduced.

3. Apparatus as in claim 1 in which said digital electrical signals include a sequence of clock pulses spaced apart from one another by substantially equal time increments and a coded sequence of signal pulses each of which occurs substantially simultaneously with one of said clock pulses, and in which said generating means includes a pair of alternating current signal generators producing output signals having subtantially different frequencies, a recording transducer, and electrical circuit means for transmitting the output signal of one of said signal generators to said transducer when one of said clock pulses is developed alone, and transmitting the output signal of the other of said signal generators to said transducer when one of said clock pulses and one of said signal pulses both are developed substantially simultaneously.

4. Apparatus as in claim 1 in which said reproducing and converting means includes a serial-to-parallel converter for converting the reproduced digital signals from serial to parallel form, intermediate storage means for storing information received from said serial-to-parallel converter until a given sequence of signals has been received, means for converting digital information into decimal form and storing the decimal-form information, an electrically-operated visual display board for displaying said decimal information, and means for eliminating old information stored in said decimal conversion and storage means, transferring new information from said intermediate storage means to said decimal conversion and storage means, thereby causing said new information to be displayed on said visual display board, and re-setting said serial-to-parallel converter and said intermediate storage means to receive a new sequence of signals upon the completion of the receipt of said given sequence of signals by said serial-to-parallel converter.

5. Apparatus for developing digital electrical signals in accordance with time, said apparatus comprising, in combination, rotary drive means adapted to produce a rotary output motion proportional to time, a rotatable member coupled to said drive means and having opaque and transparent regions arranged in a coded pattern in a wall of said member, a light source positioned on one side of said wall so as to shine through transparent regions of said wall adjacent said light source, means for converting the coded light signals shining through said wall at a given position on said rotatable member into digital electrical signals, said light-to-electrical signal converting means including a housing, a scanning rotor mounted to rotate in said housing, a scanning member mounted on said rotor, photoelectric means associated with said scanning member to receive said coded light signals from said scanning member at a plurality of positions in said housing and convert said coded light signals into said digital electrical signals, said rotor having a plurality of holes positioned in one of its walls at spacings corresponding to the spacings of said positions at which said coded light signals are received in said housing, a lamp associated with said rotor, and second photoelectric means for receiving clock light signals passing from said lamp through said holes in said rotor and producing an electrical clock signal corresponding to each of said clock light signals so received, said rotor being driven by said rotary drive means at a speed proportional to the speed of said rotatable member, and said scanning member being positioned with respect to said holes in said rotor so that said digital and clock electrical signals are produced substantially simultaneously.

6. Apparatus for developing digital electrical signals in accordance with time, said apparatus comprising, in combination, rotary drive means adapted to produce a rotary output motion proportional to time, a rotatable member coupled to said drive means and having opaque and transparent regions arranged in a coded pattern in a wall of said member, a light source positioned on one side of said wall so as to shine through transparent regions of said wall adjacent said light source, means for converting the coded light signals shining through said wall at a given position on said rotatable member into digital electrical signals, said light-to-electrical signal converting means including a housing, a scanning rotor mounted to rotate in said housing, a scanning member mounted on said rotor, photoelectric means associated with said scanning member to receive said coded light signals from said scanning member at a plurality of positions in said housing and convert said coded light signals into said digital electrical signals, said rotor having a plurality of holes positioned in one of its walls at spacings corresponding to the spacings of said positions at which said coded light signals are received in said housing, a lamp associated with said rotor, second photoelectric means for receiving clock light signals passing from said lamp through said holes in said rotor and producing an electrical clock signal corresponding to each of said clock light signals so received, and a plurality of light-transmitting rods, one of said rods being provided for each circumferential row of transparent regions on said rotatable member, said rods being mounted to conduct said coded light signals from said rotatable member to said positions on said housing of said light-to-electrical signal converting means.

7. Apparatus for developing digital electrical signals in accordance with time, said apparatus comprising, in combination, rotary drive means adapted to produce a rotary output motion proportional to time, a rotatable member coupled to said drive means and having opaque and transparent regions arranged in a coded pattern in a wall of said member, a light source positioned on one side of said wall so as to shine through transparent regions of said wall adjacent said light source, means for converting the coded light signals shining through said wall at a given position on said rotatable member into digital electrical signals, said light-to-electrical signal converting means including a housing, a scanning rotor mounted to rotate in said housing, a scanning member mounted on said rotor, and photoelectric means associated with said scanning member to receive said coded light signals from said scanning member at a plurality of positions in said housing and convert said coded light signals into said digital electrical signals, said scanning member comprising a generally L-shaped member of light-transmitting material with one of its ends being aligned with the axis of rotation of said rotor and positioned to deliver light to said photoelectric means, and the other of its ends being aligned transverse to said axis and being positioned so as to sweep past said positions to receive said coded light signals upon rotation of said rotor.

8. Apparatus for developing digital electrical signals in accordance with time, said apparatus comprising, in combination, a synchronous electrical motor for producing a rotary output motion proportional to time, an opaque rotatable drum coupled to said motor and having holes in its wall forming transparent regions arranged in a coded pattern, a light source positioned on one side of said wall so as to shine through transparent regions of said wall adjacent said light source, means for converting the coded light signals shining through said wall at a given position on said drum into digital electrical signals, said light-to-electrical signal converting means including a housing, a scanning rotor mounted to rotate in said housing, a scanning member mounted on said rotor, photoelectric means associated with said scanning member to receive said coded light signals from said scanning member at a plurality of positions in said housing and convert said coded light signals into said digital electrical signals, said rotor having a plurality of holes positioned in one of its walls at spacings corresponding to the spacings of said positions at which said coded light signals are received in said housing, a lamp associated with said rotor, and second photoelectric means for receiving clock light signals passing from said lamp through said holes in said rotor and producing an electrical clock signal corresponding to each of said clock light signals so received, two other drums and two other light sources associated with said two other drums, each of said two other drums having holes in its peripheral wall arranged in a binary coded pattern and being adapted to deliver coded light signals to said light-to-electrical signal converting means, a Geneva mechanism coupling said first-mentioned drum to said synchronous motor, and other Geneva mechanisms coupling said other drums together and to said first-mentioned drum so that each of said other drums rotates at a speed which is a fraction of that of the first-mentioned drum, one of said drums providing coded light signals representing seconds of time, another providing coded signals representing minutes of time, and the remaining drum providing coded signals representing hours of time.

References Cited

UNITED STATES PATENTS

| | | | |
|---|---|---|---|
| 2,496,103 | 1/1950 | Neufeld | 179—100.2 |
| 2,901,730 | 8/1959 | Goddard | 340—173 |
| 2,938,666 | 5/1960 | Rand | 250—227 |
| 3,164,677 | 1/1965 | Morris | 235—92 |
| 3,178,699 | 4/1965 | Burton | 250—219 |

BERNARD KONICK, *Primary Examiner.*

R. SNIDER, A. I. NEUSTADT, *Assistant Examiners.*